Patented Dec. 1, 1936

2,062,918

UNITED STATES PATENT OFFICE 2,062,918

POLYHYDRIC ALCOHOL ESTERS

Walter E. Lawson, Woodbury, N. J., assignor to E. I. du Pont de Nemours & Company, Wilmington, Del., a corporation of Delaware No Drawing. Application March 28, 1935
Serial No. 13,485

16 Claims. (Cl. 260—106)

This invention relates to new compositions of matter, more particularly to monocarboxylic acid esters of long chain polyhydric alcohols having at least three hydroxyl groups. The invention further relates to plasticized compositions containing cellulose derivatives and these esters. In its preferred form this invention relates to esters of polyhydric alcohols obtainable by the peracetylation or other peracylation of higher unsaturated alcohols such as oleyl alcohol.

The esters of the present invention may be made by the following general methods:

(1) Peracylation of an unsaturated alcohol to obtain a monoester followed by further esterification with a monobasic acid, for example, treatment of oleyl alcohol with peracetic acid to obtain the monoacetate of octadecanetriol which is then acetylated to obtain the triacetate of octadecanetriol.

(2) Hydroxylation of polyunsaturated alcohols such as linoleyl alcohol followed by esterification, as for example, the hydroxylation of linoleyl alcohol will yield a trihydroxy alcohol which on esterification will yield a tri-ester. The hydroxylation may be carried out for example by sulfation of the unsaturated alcohol followed by hydrolysis in dilute acid solution.

(3) Addition of hypochlorous acid to an unsaturated alcohol followed by treatment with an acid anhydride and sodium acetate to convert to the polyacetate, for example, condensation of oleyl alcohol with hypochlorous acid and conversion of the resulting chlorohydrin to the triacetate.

Having outlined above the general methods of preparation, the following exemplifications thereof are added for purposes of illustration but not in limitation:

*Example 1.—Octadecanetriol and octadecanetriol triacetate*

Two hundred sixteen parts by weight of pure oleyl alcohol, 1200 cc. of glacial acetic acid and 456 g. of 30% hydrogen peroxide were placed in a two-liter, three-neck flask and heated with a water bath to 75°–80° C. for 2 hrs. The product was washed with water to remove acetic acid and the hydrogen peroxide. Ethyl acetate was added to dissolve the waxy material and the solution washed with boiling water until neutral. The solvent was then removed by evaporation and the remaining oil had an iodine number of 4. The oil was next treated with hot water containing alkali until neutral and then boiled with 50 g. of sodium hydroxide in 500 cc. of water with agitation for 6 hrs. The product was finally washed with boiling water and then recrystallized three times from ethyl acetate. The white crystalline octadecanetriol melted at 80°–81° C.

A mixture of twenty-four parts by weight of octadecanetriol and 240 parts by weight of acetic anhydride were refluxed for 26 hrs. An oily layer was thrown out by dilution with water and then thoroughly washed with water until neutral. The oily layer was diluted with ether, treated with charcoal and dried over sodium sulfate. After removing the ether on the steam bath the light brown oil was heated in a vacuum oven for 3 hrs. The oil had an acid number of 1.2 and a saponification number of 375, which indicates a purity of 95.5% of the triacetate of octadecanetriol. This ester was insoluble in water, but soluble in acetic acid, ether, acetone, ethyl acetate, toluene, and gasoline.

*Example 2*

One part by weight of ethyl cellulose dissolved in 11 parts by weight of a toluene—ethyl alcohol mixture, 7 parts of toluene and 1 part of octadecanetriol triacetate were blended together to give a clear lacquer base. Further dilution with toluene gave a lacquer of spraying viscosity which yielded clear, flexible films.

*Example 3*

One part of nitrocellulose in 3 parts of a solvent mixture containing essentially butyl acetate, 3 parts of butyl acetate and 1 part of octadecanetriol triacetate were blended together to give a clear lacquer which yielded clear, flexible films.

*Example 4*

One part of cellulose acetate dissolved in 5.7 parts of a solvent mixture containing essentially acetone was diluted with 6.7 parts of acetone and 1 part of octadecanetriol triacetate added. This yielded a compatible lacquer. On evaporation of the solvent, the residue was a tough plastic material suitable for formation into rods, tubes, and sheets.

*Example 5.—Octadecanetriol monoacetate and triacetate*

Two hundred sixty-eight parts by weight of oleyl alcohol, 228 parts by weight of 30% hydrogen peroxide and 600 parts by weight of glacial acetic acid were heated in a 2 liter flask with stirring at 80° C. for 13 hrs. The product was washed three times with salt water, diluted with ether, and the ether solution dried with sodium sulfate. After filtering the ether was evaporated, and the oily product had an iodine number of 4 and a saponification number of 184. The calculated saponification number for the monoacetate of octadecanetriol is 163. The monoacetate of octadecanetriol is soluble in benzene, ethyl acetate, ether, and acetone, but is insoluble in water. It is compatible with nitrocellulose. Two hundred seventy-six parts by weight of the monoacetate of octadecanetriol, 900 parts by weight of acetic anhydride and a small amount of hydrogen chloride were heated under a reflux condenser 6 hrs. at 100°–110° C. and finally 4 hrs. at 125°–130° C. The product was washed with water, dissolved in ether, the ether solution dried with sodium sulfate, filtered, and the ether evaporated. Two hundred seventy parts by weight of light-brown oil with a saponification number of 356 and an acid number of 7 was obtained. This oil was fractionated and the main fraction distilled over at 190°–204° C. at 1 mm. as a straw-colored oil.

*Example 6.—Peracetylation of ricinoleyl alcohol*

One hundred forty-two parts by weight of ricinoleyl alcohol obtained by sodium reduction of ethyl ricinoleate, 114 parts by weight of 30% hydrogen peroxide, and 300 parts by weight of glacial acetic acid were stirred under reflux at 80°–90° C. for 5 hrs. The product was diluted with ether, washed with water to remove the unreacted acetic acid and the ether solution dried with sodium sulfate. After filtering, the ether was evaporated and the straw-colored oil which remained had an iodine number of 11, whereas the original alcohol had an iodine number of 92.5. The product was the monoacetate ester of octadecanetetrol-1,9,10,12 and was used in plasticizing nitrocellulose compositions. This product was treated with a mixture of acetic acid and acetic anhydride and converted to the tetraacetate of octadecanetetrol, a viscous oil insoluble in water but soluble in esters, ketones, and hydrocarbons, and being a plasticizer for nitrocellulose.

*Example 7.—Mixture of triacetates of $C_{12}$, $C_{14}$, $C_{16}$, $C_{18}$, $C_{20}$, $C_{22}$ triols*

A mixture containing 345 g. of technical octadecanetriol monoacetate, 200 g. acetic acid, 300 g. ethylene dichloride, 2 g. sulfuric acid were heated to boiling in an apparatus designed to separate water from the distillate and to return the ethylene dichloride to the reaction vessel. Distillation was continued until the theoretical amount of water had been removed. The product was washed with sodium carbonate solution to remove excess acid and was refined by heating to 130° C. under 50 mm. pressure to remove volatile material. The resulting product was treated with decolorizing carbon and filtered. A light-colored oil resulted. This was insoluble in water but soluble in esters, ketones and hydrocarbons. It was particularly well suited as a plasticizer for nitrocellulose. The technical octadecanetriol monoacetate used in this example was made from the technical alcohol obtained by the carboxylic hydrogenation of sperm oil and had the following approximate composition: unsaturated alcohols $C_{12}$ 0.8%; $C_{14}$ 6.4%; $C_{16}$ 21.4%; oleyl 34.9%; $C_{20}$ 12.4%; $C_{22}$ 0.4%; and saturated alcohols $C_{10}$ 1%; $C_{12}$ 3.7%; $C_{14}$ 5.9%; $C_{16}$ 4.9%; $C_{18}$ 7.2%; $C_{20}$ 0.7%.

*Example 8.—Octadecanetriol trilaurate*

A mixture containing 1 gram mol. of octadecanetriol, 3.3 gram mols of methyl laurate, 500 g. toluene and 5 g. litharge were heated to boiling under a good fractionating column. Distillation was continued until the theoretical amount of methanol-toluene binary had been obtained, indicating complete reaction of the octadecanetriol with methyl laurate to produce methanol and octadecanetriol trilaurate. The product was filtered to remove litharge and refined by heating to 130° C. at 50 mm. followed by steaming to remove all traces of volatile materials. The resulting product was treated with decolorizing carbon and filtered hot. Octadecanetriol trilaurate is a low-melting solid which is soluble in benzene and ether.

*Example 9*

Ninety-three parts by weight of an unsaturated alcohol, obtained by sodium reduction of China wood oil, which had an iodine number of 176, was dissolved in 600 parts by weight of glacial acetic acid and 200 parts by weight of 30% hydrogen peroxide. The mixture was heated under a reflux condenser at 75° C. for 6 hrs. and then left to stand at room temperature three days. The acetic acid solution was diluted with salt water and the oil washed several times with water to remove unreacted hydrogen peroxide and acetic acid. The oil was diluted with toluene and the water was removed by distilling off the water-toluene binary. Removal of the toluene by distillation leaves an oily product which is an octadecanepentol diacetate which is soluble in esters and hydrocarbons, insoluble in water, and is a plasticizer for cellulose derivatives. One hundred seventeen parts by weight of this diacetate ester, 240 parts by weight of glacial acetic acid, 3 parts by weight of sulfuric acid, and 500 cc. of toluene were heated under a 4 ft. distilling column until all of the water of reaction was removed. The reaction mixture was washed with water and the toluene evaporated. The resulting oil had a saponification number of 340, indicating three of the five possible hydroxyl groups were esterified. This octadecanepentol triacetate is soluble in ethyl acetate, toluene, ether, and acetone, and is insoluble in water. It plasticizes nitrocellulose compositions.

Altho certain acids have been disclosed in the examples, monocarboxylic acids in general may be employed. These include aliphatic, alicyclic, heterocyclic and aromatic, saturated and unsaturated, substituted and unsubstituted, branched or straight chain acids such as acetic, propionic, isobutyric, butyric, lauric, oleic, stearic, palmitic, arachidic, branched chain acids corresponding to the higher alcohols, obtained as a by-product of the methanol synthesis, capric, caprylic, caproic, levulinic, glycollic, lactic and similar acids; benzoic, benzoylbenzoic, chlorobenzoylbenzoic, hexahydrobenzoic, octahydrocinnamic, cyclohexylacetic, and the naphthenic acids obtained in the petroleum industry. The anhydrides, the acid chlorides, or the methyl or other volatile alcohol esters of any of these acids or mixtures thereof may be employed in the esterification of the polyhydric alcohols according to the methods above disclosed.

The process for the preparation of polyhydric alcohol esters of the present invention is generally applicable in the preparation of esters from alcohols of 11 to 22 carbon atoms having at least three hydroxyl groups. These alcohols may be prepared by the peracylation of unsaturated alcohols such as phytol.

The invention is most feasibly applicable to the esterification of unsaturated alcohols derivable by carboxyl reduction of fats and oils, containing 11 to 22 carbon atoms and preferably those containing approximately 18 carbon atoms. The alcohols below 11 do not give a sufficiently non-volatile ester for satisfactory plasticization. Those within the range 11 to 22 have a combination of low volatility and adequately high solvent power for cellulose derivatives. Thus dodecanetriol triacetate is not unlike butyl acetate in solvent power for nitrocellulose but is substantially non-volatile and is therefore useful as a plasticizer whereas butyl acetate is substantially useless as a plasticizer. Octadecanetriol triacetate is not unlike hexyl acetate in solvent power for nitrocellulose but is useful as a plasticizer because of its low volatility whereas hexyl acetate is not. The invention is thus applicable to undecylenyl alcohol, to oleyl alcohol, or the mixture of unsaturated alcohols obtainable by sodium reduction of sperm whale oil, eleostearyl alcohol obtained by sodium reduction of eleostearic acid esters, linoleyl alcohol obtained by sodium reduction of methyl linoleate, and ricinoleyl alcohol obtained by sodium reduction of ethyl ricinoleate. Undecylenyl alcohol yields an undecanetriol, oleyl alcohol yields and octadecanetriol, ricinoleyl alcohol yields an octadecanetetrol, linoleyl alcohol yields an octadecanepentol, and eleostearyl alcohol yields an octadecaneheptol. The invention is also applicable to the preparation of esters from polyolefines by peracylation followed by a completion of the acylation. Diolefines which are especially useful as intermediates for peracylation are, for example, the diolefines which result from the dehydration of unsaturated alcohols, e. g., $CH_3(CH_2)_7CH=CH(CH_2)_6CH=CH_2$ from oleyl alcohol. A particularly suitable source of unsaturated alcohols for dehydration is the mixture of alcohols obtained by the carboxyl reduction of sperm whale oil. Any of these polyhydric alcohols or mixtures thereof and polyhydric alcohols generally having from 11 to 22 carbon atoms and having at least three hydroxyl groups may be used with any of the above acids or mixtures thereof in the preparation of esters suitable for use in the manufacture of plasticized compositions. All of the esters prepared in this manner are substantially non-volatile and have been found to be satisfactory plasticizers for cellulose derivatives, and natural and synthetic resins. Thus they may be used with or without solvents such as suitable mixtures of esters, alcohols and hydrocarbons in coating or plastic compositions containing cellulose esters such as cellulose nitrate, cellulose propionate, cellulose butyrate, cellulose isobutyrate, cellulose crotonate, cellulose acetobutyrate, and cellulose ethers such as ethyl cellulose, benzyl cellulose, glycol cellulose, etc., with natural resins such as dammar, synthetic resins such as phenol aldehyde resins, polystyrene resins, resins produced by condensation of ketones, ether resins etc., and drying and simidrying oils, e. g. castor oil. Waxes such as paraffin wax, pigments, plasticizers such as dibutylphthalate, and organic fillers such as wood flour or cellulose may also be employed in these coating or plastic compositions. The new compounds when employed as plasticizers may be used in any amount from 5 to 200% based upon the cellulose derivatives being modified.

The derivatives may be used in the preparation of all types of compositions containing cellulose derivatives or natural and synthetic resins, oils, pigments, and filling materials. Specifically they may be used in the preparation of lacquers and enamels for coating metals, wood, and paper, in dopes for coating fabrics, in moistureproof lacquers for coating regenerated cellulose, in plastic compositions to be used in the preparation of toiletware, novelties, sheeting, rods, tubes, safety glass interlayers, etc., and, in lacquers for coating wire screens and in the preparation of thin sheets for wrapping purposes.

An advantage of this invention is that it furnishes extremely high-boiling, water-resistant plasticizers. Some of these materials give extremely tough plastic compositions when used with cellulose derivatives and the products produced are substantially permanently flexible. Whereas polybasic acid esters of polyhydric alcohols are readily converted to infusible, insoluble products unsuited for use as plasticizers, it has been found that the monobasic acid esters of long chain polyhydric alcohols do not become infusible and insoluble in organic solvents but are eminently suitable as plasticizers.

The esters of the present invention may be generally described as esters of a polyhydric alcohol of the formula:

$$C_nH_{2n+2-x}(OH)_x$$

In this formula $n$ is from 11 to 22 and $x$ is at least three but is preferably less than $n$.

The above description and examples are intended to be illustrative only. Any modification of or variation therefrom which conforms to the spirit of the invention is intended to be included within the scope of the claims.

I claim:

1. An ester wherein all of the hydroxyl groups of a long chain aliphatic polyhydric alcohol of the formula $$C_nH_{2n+2-x}(OH)_x$$

wherein $x$ is at least 3 and $n$ is 11 to 22, are esterified by a monocarboxylic acid.

2. An ester composition wherein a mixture of trihydric alcohols containing 12, 14, 16, 18, 20 and 22 carbon atoms have all of the hydroxyl groups of the trihydric alcohols esterified by a monocarboxylic acid.

3. An ester wherein all of the hydroxyl groups of a long chain aliphatic polyhydric alcohol of the formula $$C_{12}H_{26-x}(OH)_x$$

wherein $x$ is at least 3, are esterified by a monocarboxylic acid.

4. Saturated esters prepared by the peracylation of unsaturated alcohols of 11 to 22 carbon atoms followed by complete esterification of the remaining hydroxyl groups by means of a monobasic carboxylic acid.

5. Saturated esters prepared by the peracetylation of unsaturated alcohols of 11 to 22 carbon atoms followed by complete esterification of the remaining hydroxy groups by means of a monobasic carboxylic acid.

6. An ester wherein all of the hydroxyl groups of a long chain aliphatic polyhydric alcohol of the formula $$C_{18}H_{38-x}(OH)_x$$

wherein $x$ is at least 3, are esterified by an aliphatic monocarboxylic acid.

7. An ester wherein all of the hydroxyl groups of a long chain aliphatic polyhydric alcohol of the formula $C_{18}H_{38-x}(OH)_x$ wherein $x$ is at least 3, are esterified by a saturated aliphatic monocarboxylic acid.

8. An ester wherein all of the hydroxyl groups of a long chain aliphatic polyhydric alcohol of the formula $C_{18}H_{38-x}(OH)_x$ wherein $x$ is at least 3, are esterified by acetic acid.

9. An ester wherein a plurality of the hydroxyl groups of a long chain aliphatic polyhydric alcohol of the formula $C_{18}H_{38-x}(OH)_x$ wherein $x$ is at least 3, is esterified by lauric acid.

10. An ester of octadecanetriol-1,9,10 wherein all of the hydroxyl groups are esterified by a monocarboxylic acid.

11. Octadecanetriol-1,9,10 triacetate.

12. Octadecanetriol-1,9,10 trilaurate.

13. A monocarboxylic acid ester of octadecanetetrol-1,9,10,12.

14. Octadecanetetrol-1,9,10,12 tetraacetate.

15. Process for the preparation of saturated esters which comprises peracetylating an unsaturated alcohol of 11 to 22 carbon atoms and thereafter completely esterifying the remaining hydroxyl groups by means of a monobasic carboxylic acid.

16. Process for the preparation of saturated esters which comprises peracylating an unsaturated alcohol of 11 to 22 carbon atoms and thereafter completely esterifying the remaining hydroxyl groups by means of a monobasic carboxylic acid.

WALTER E. LAWSON.